(12) United States Patent
Steinhart

(10) Patent No.: US 6,322,063 B1
(45) Date of Patent: Nov. 27, 2001

(54) CLAMPING DEVICE FOR WORKPIECES

(75) Inventor: Wilhelm Steinhart, Friedberg (DE)

(73) Assignee: Kuka Schweissanlagen GmbH (DE)

( * ) Notice: Subject to any disclaimer, the term of this patent is extended or adjusted under 35 U.S.C. 154(b) by 0 days.

(21) Appl. No.: 09/595,138

(22) PCT Filed: Dec. 16, 1998

(86) PCT No.: PCT/EP98/08238

§ 371 Date: Jun. 15, 2000

§ 102(e) Date: Jun. 15, 2000

(87) PCT Pub. No.: WO99/30868

PCT Pub. Date: Jun. 24, 1999

(30) Foreign Application Priority Data

Dec. 17, 1997 (DE) .......................................... 297 22 276 U

(51) Int. Cl.$^7$ .................................................. B25B 1/00
(52) U.S. Cl. ............................ 269/152; 269/45; 269/75
(58) Field of Search .......................... 269/152, 45, 35, 269/43, 20, 82, 83, 84, 85, 71, 75

(56) References Cited

U.S. PATENT DOCUMENTS

| | | | |
|---|---|---|---|
| 688,230 | * 12/1901 | Isgrig | ........ 269/45 |
| 1,524,486 | 1/1925 | Marcalus et al. . | |
| 2,497,943 | * 2/1950 | Ingwer | ........ 269/45 |
| 3,848,865 | * 11/1974 | Bird | ........ 269/69 |
| 3,858,864 | * 1/1975 | Waldow | ........ 269/152 |
| 4,057,294 | 11/1977 | Krekeler . | |
| 4,214,739 | * 7/1980 | Dailey | ........ 269/75 |
| 4,691,905 | 9/1987 | Tamura et al. . | |
| 4,951,932 | 8/1990 | Thomas . | |
| 5,280,892 | * 1/1994 | Smith | ........ 269/75 |
| 5,505,556 | 4/1996 | Brown et al. . | |
| 5,605,275 | 2/1997 | Rintala . | |
| 5,984,288 | * 1/1999 | Kipping | ........ 269/45 |

FOREIGN PATENT DOCUMENTS

| | | |
|---|---|---|
| 38 01 813 A1 | 8/1989 | (DE) . |
| 42 43 370 A1 | 6/1994 | (DE) . |
| 195 36 341 A1 | 4/1997 | (DE) . |
| 197 16 874 A1 | 11/1997 | (DE) . |
| 19716874A * | 11/1997 | (DE) ........ 269/45 |
| WO 96/38265 | 12/1996 | (WO) . |

* cited by examiner

Primary Examiner—Joseph J. Hail, III
Assistant Examiner—Daniel Shanley
(74) Attorney, Agent, or Firm—McGlew and Tutle, P.C.

(57) ABSTRACT

A clamping device (1) is disclosed for one or several workpieces (2), especially bodywork parts. The clamping device (1) includes one or several clamps (4) which can be positioned on a clamping table. Several parts can be displaced along at least one axis. The clamps (4) comprise a positioning device (13) and a fixing device (10). The positioning device (13) has a height adjustment system (21) and/or angle adjustment system (22) and/or lateral adjustment system (4b). To allow for stepless adjustment over a wide range the positioning device (13) has a coarse adjustment system (43) and a fine adjustment system (44). The fixing device (10) can be configured as a clamping device (35) and simultaneously include the lateral adjustment system (4b).

20 Claims, 7 Drawing Sheets

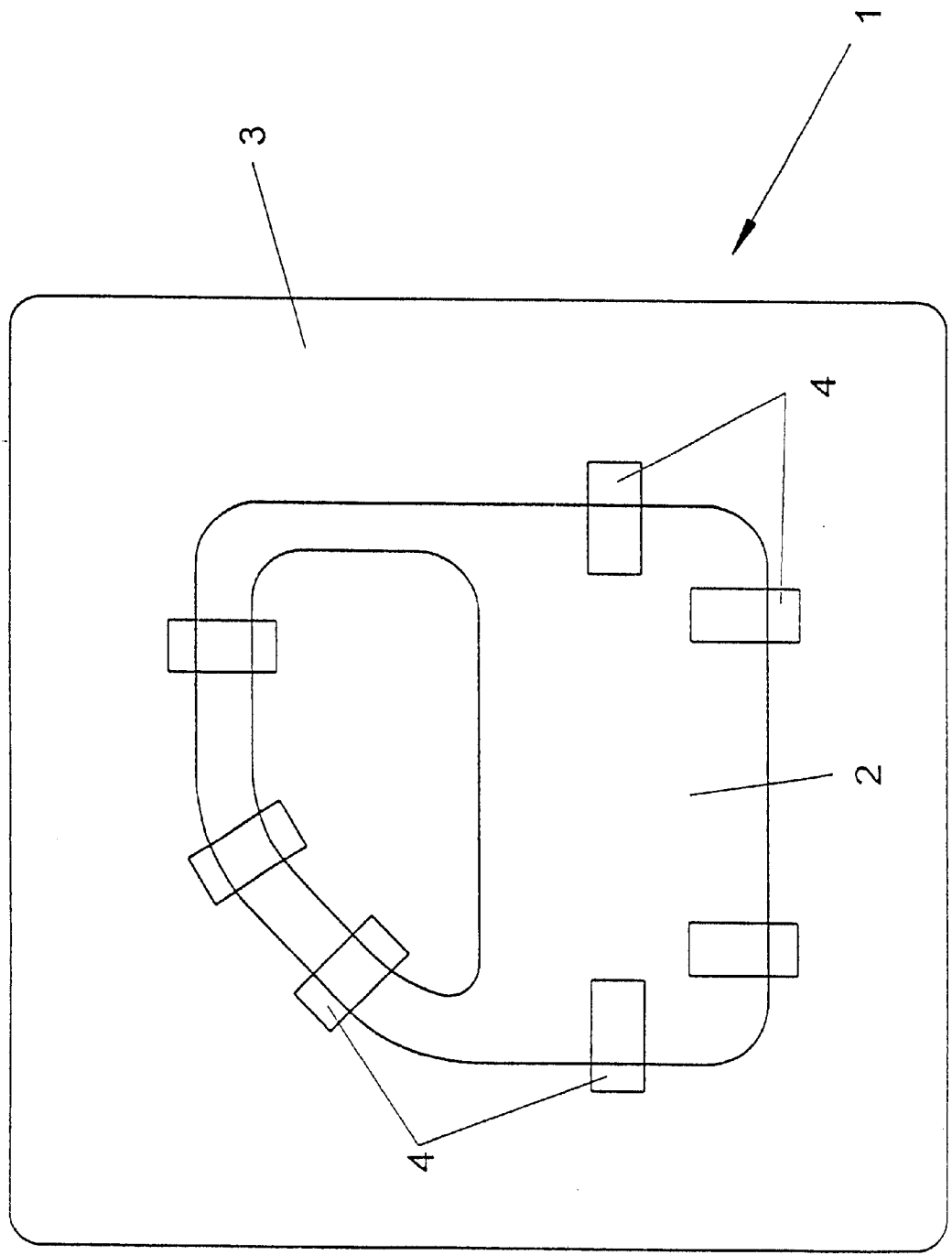

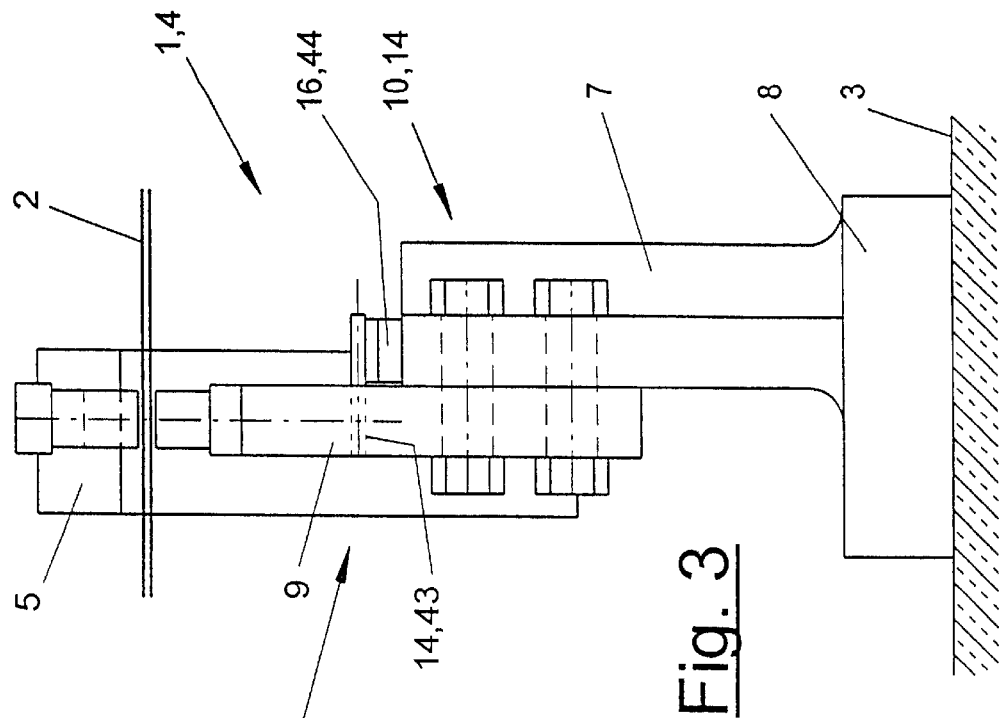
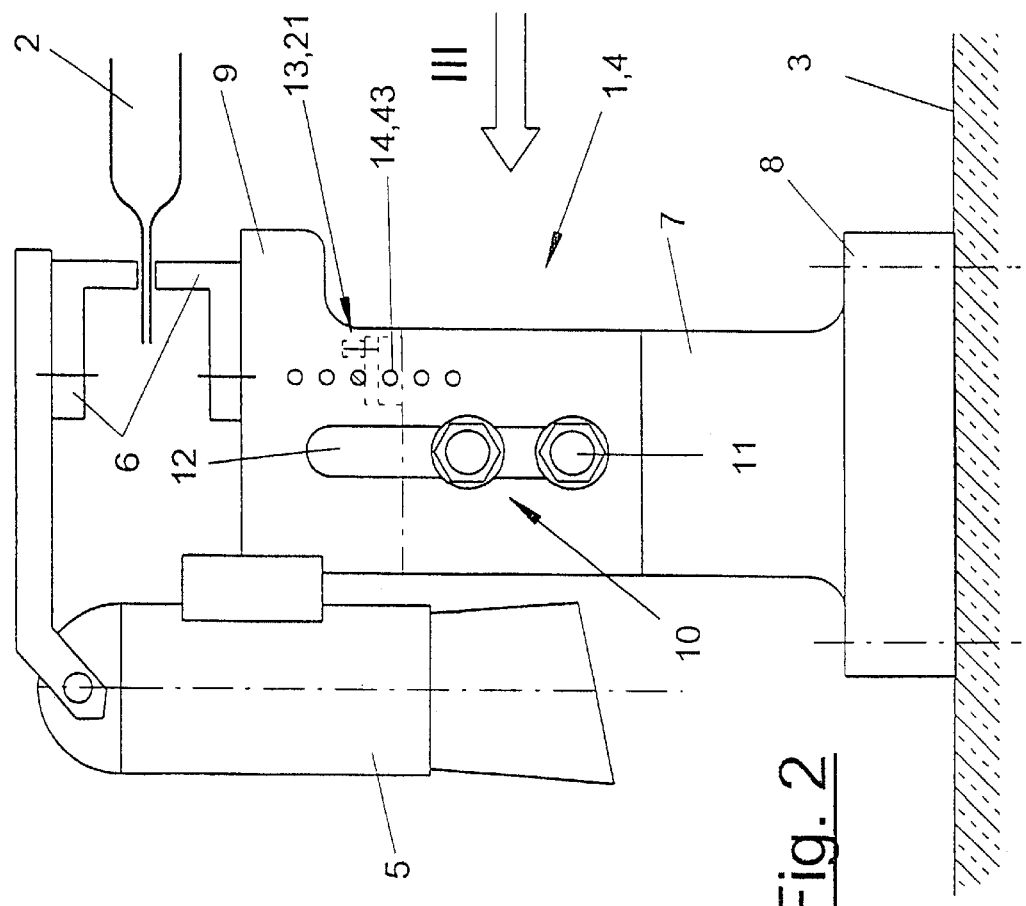

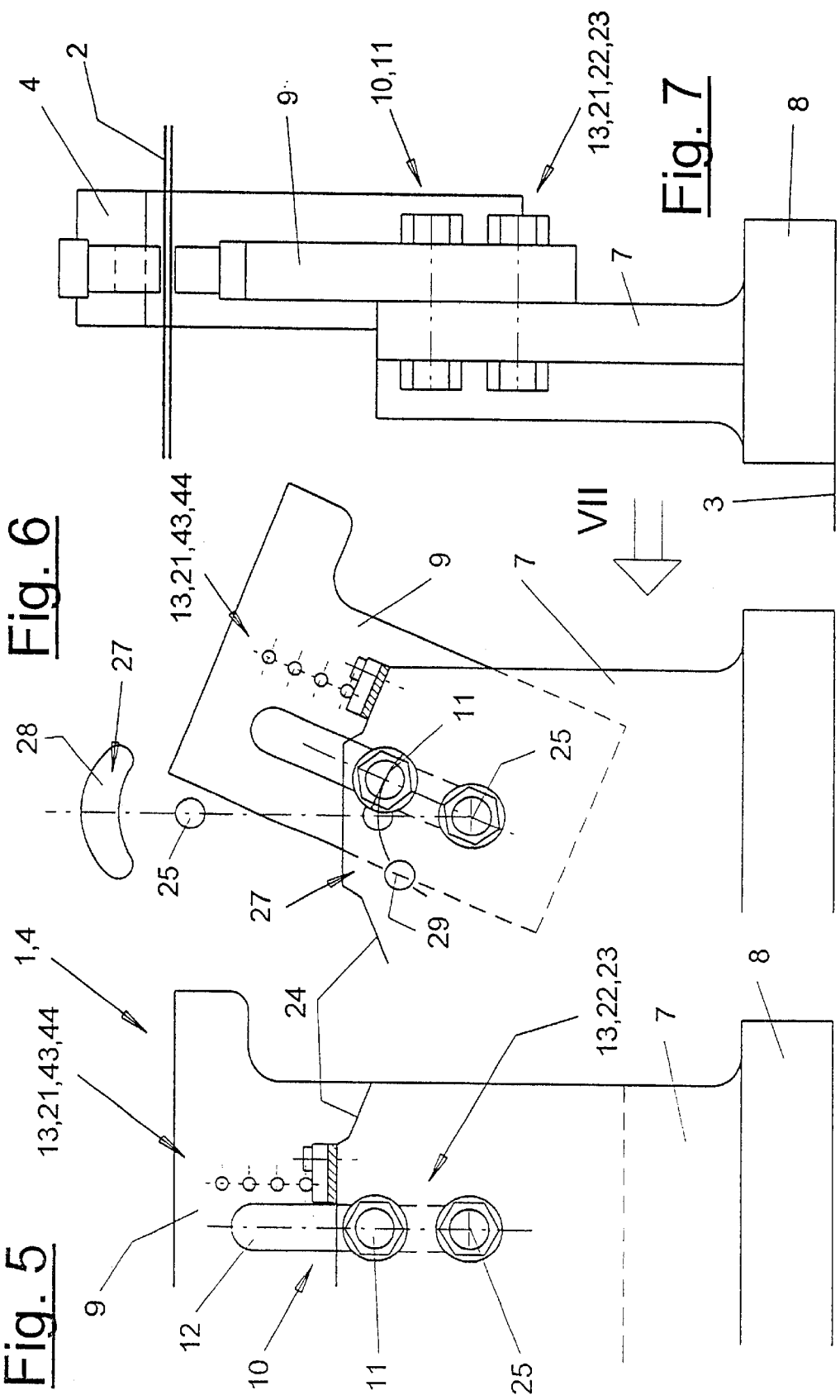

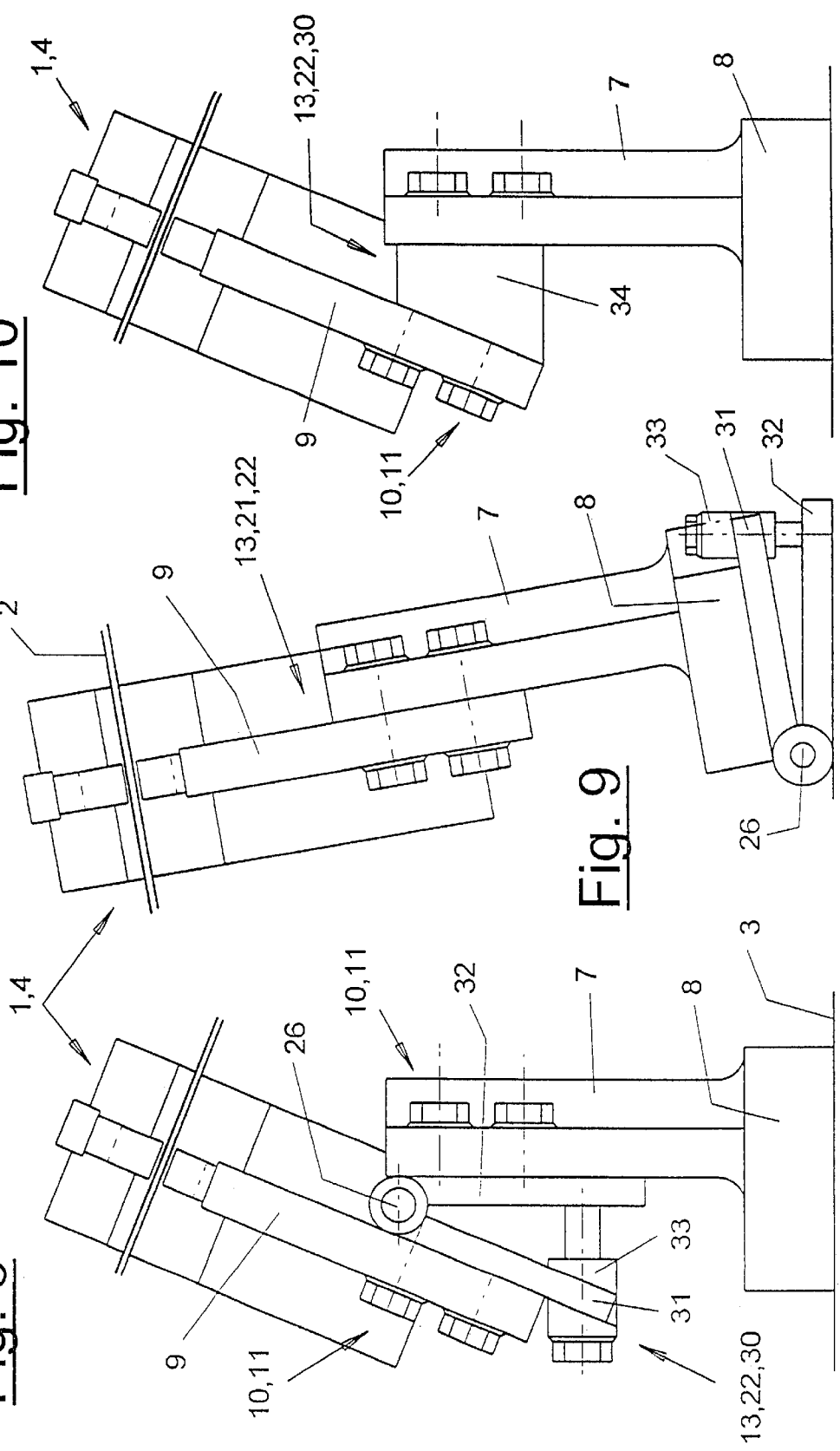

CLAMPING DEVICE FOR WORKPIECES

FIELD OF THE INVENTION

The present invention pertains to a clamping apparatus for workpieces, especially body parts with one or more tensioner, which can be positioned on a said clamping table. The tensioners have a plurality of tensioner parts, which are guided adjustably in relation to one another along at least one axis and which have a positioning device (13) with a vertical adjustment device and a fixing device for the mutual adjustment.

BACKGROUND OF THE INVENTION

Such a clamping apparatus has been known from DE-A 197 16 874. It comprises one or more tensioners, which can be positioned on a clamping table and with which the workpiece, e.g., body parts of vehicles, can be clamped. The workpiece can then be welded or machined in another way by an industrial robot or the like. The tensioners are of a multipart design and comprise a foot part, a middle part and a head part, which are guided adjustably relative to another along at least one axis. A positioning apparatus with vertical adjustment apparatus and a fixing device are present for the mutual adjustment. The vertical adjustment apparatus comprises one or more adjusting screws between the parts of the tensioner. The foot part may also be fastened to the clamping table via a spacer placed under it. The fixing device comprises an elongated hole guide with two clamping screws. Moreover, the positioning apparatus may also comprise an angle adjustment apparatus with an additional pivot bearing between the parts of the tensioner. As an alternative, it is also possible to use a bent middle part. The lower adjusting screw for the vertical adjustment apparatus is reserved for the supplier and is used to set a fixed basic length of the clamping unit specified by the user. Only the upper adjusting screw between the middle part and the head part is then accessible to the customer and user. He can then perform a fine adjustment within a narrow range by apparatus of this adjusting screw. The tensioners are accurately positioned according to the user's specifications and hold the workpiece in the specified position. Inaccurate workpieces (pilot run) as well as warping during machining may make it necessary to adjust the clamping points. This adjustment can be carried out by the customer with the prior-art tensioner only with the upper adjusting screw and in a range limited by the screw. The inaccuracies inherently existing in adjusting screws must be accepted here. The tensioner as a whole can be adjusted vertically continuously by apparatus of the adjusting screws.

WO 96/38265 shows another clamping unit, which comprises a bracket, a clamping frame, a centering piece and a support that can be fastened thereto. This clamping unit has a fixed, predetermined length, which is determined by the length of the support cut as needed. The support may assume different angular positions in relation to the foot-side bracket, which can be achieved by dividing the clamping frame and the centering piece into mutually independent components and by apparatus of correspondingly shaped connection surfaces.

U.S. Pat. No. 2,497,943 discloses another clamping unit for sewing machines, typewriters, electric motors or the like for repair purposes. It has a pivotable bracket with clamping jaws for this purpose, which can be adjusted by apparatus of a spindle.

Clamping pallets for workpieces on machine tools or gaging machines have been known from DE-A 195 36 341, DE-A 42 43 370 and DE-A 38 01 813. The tensioners have clamping claws, which are vertically adjustable by apparatus of adjusting screws, toothed plates or the like. Finally, a clamping unit with a plurality of clamping parts that are angularly adjustable in relation to one another has been known from GB-A 1 466 434.

SUMMARY AND OBJECTS OF THE INVENTION

The object of the present invention is therefore to provide a more flexible clamping apparatus.

According to the invention, a clamping apparatus is provided for workpieces, especially body parts. The clamping apparatus comprising one or more tensioners, which can be positioned on a clamping table. The tensioners have a plurality of tensioner parts, which are guided adjustably in relation to one another along at least one axis and which have a positioning apparatus with a vertical adjustment device and a fixing device for the mutual adjustment. The vertical adjustment has a coarse adjustment device and a fine adjustment device, wherein the coarse adjustment device has a grid-like mount and a hinge pin on one tensioner part and the fine adjustment device has a support and optionally one or more fitting plates and a fixing device for supporting the hinge pin on the other tensioner part.

In the clamping apparatus, the individual tensioners have a multipart design in themselves and are adjustable along at least one translatory and/or rotary axis, i.e., especially vertically and/or in at least one lateral direction and/or in at least one angle. For an exact adjustment, they have a positioning means and a fixing device, wherein these means may be structurally separate or combined. As a result, the tensioners can be adjusted vertically and/or angularly as desired to compensate distortion and warping phenomena. The tensioners are thus changed in themselves. Disassembly and repositioning of the tensioners is not necessary.

The clamping apparatus has the advantage that a small number of standard elements are sufficient for a broad field of application. Continuous vertical, lateral and/or angular adjustment is possible with high accuracy and reproducibility.

Two possibilities of adjustment, namely, a coarse adjustment and a fine adjustment for highly accurate adjustment that nevertheless covers a broad range, are possible for vertical adjustment. A grid-like mount with a stepwise adjustment in greater increments in combination with suitable, accurately fitting supports offers advantages at least for the vertical adjustment in terms of handling, precision and the manufacturing and assembly efforts. The supports may be designed as disks and have an additional lateral mobility for the lateral adjustment.

The clamping apparatus makes possible a simple adjustment at the manufacturer or at the site of installation. Furthermore, it is possible to prepare the foot part and the adjusting part of the tensioners from simple stock parts without project-specific machining. The accurate setting of the tensioners is performed only by means of the positioning and fixing device.

The preferred fixing device with the clamping apparatus has the advantage that it can also be used as a positioning device for the lateral adjustment at the same time. By placing a wedge part or a pressure piece against a corner area of the component member or adjusting part being guided, force is introduced obliquely, which ensures better fixation. As a result, it is possible, in particular, to support the adjusting part in a plurality of directions or axes. Additional fixations may be eliminated. The adjusting part can be accurately positioned by means of distance plates and fitting plates. Moreover, the position of the adjusting part can be statically defined.

The fixing device allows tolerance errors on the component members and the parts of the clamping apparatus and as a result it always ensures reliable fixation in the correct position. By inserting distance plates and fitting plates, shim rings or other similar positioning elements, particularly accurate mutual positions of the component members can also be set and secured.

For the lateral adjustment, additional lateral mobilities may be available at the other positioning means. These may be advantageously provided in the area of the supports and hinge pins. Furthermore, it is favorable to arrange a positive-locking plug-in connection between the support and the hinge pin and, in addition, to provide a fixation. This is practical for accurate positioning and prevents the loss of parts during disassembly or reassembly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a schematic top view of a clamping table with a clamping apparatus and a clamped workpiece;

FIG. 2 is a side view of an individual tensioner with a vertical adjustment means;

FIG. 3 is a front view of the tensioner according to arrow III in FIG. 2;

FIG. 5 is a view showing an operating position of a tensioner with a vertical and angular adjustment device;

FIG. 6 is a view showing another operating position of a tensioner with a vertical and angular adjustment device;

FIG. 7 is a view showing another operating position of a tensioner with a vertical and angular adjustment device;

FIG. 8 is a side view of a variant of the embodiment of FIGS. 5 through 7 with another angular adjustment device;

FIG. 9 is a front view of the variant of the embodiment of FIGS. 5 through 7 with another angular adjustment device showing an operating position;

FIG. 10 is a view of the variant of the embodiment of FIGS. 5 through 7 with another angular adjustment device showing another operating position;

DESCRIPTION OF THE PREFERRED EMBODIMENT

Figure 4:
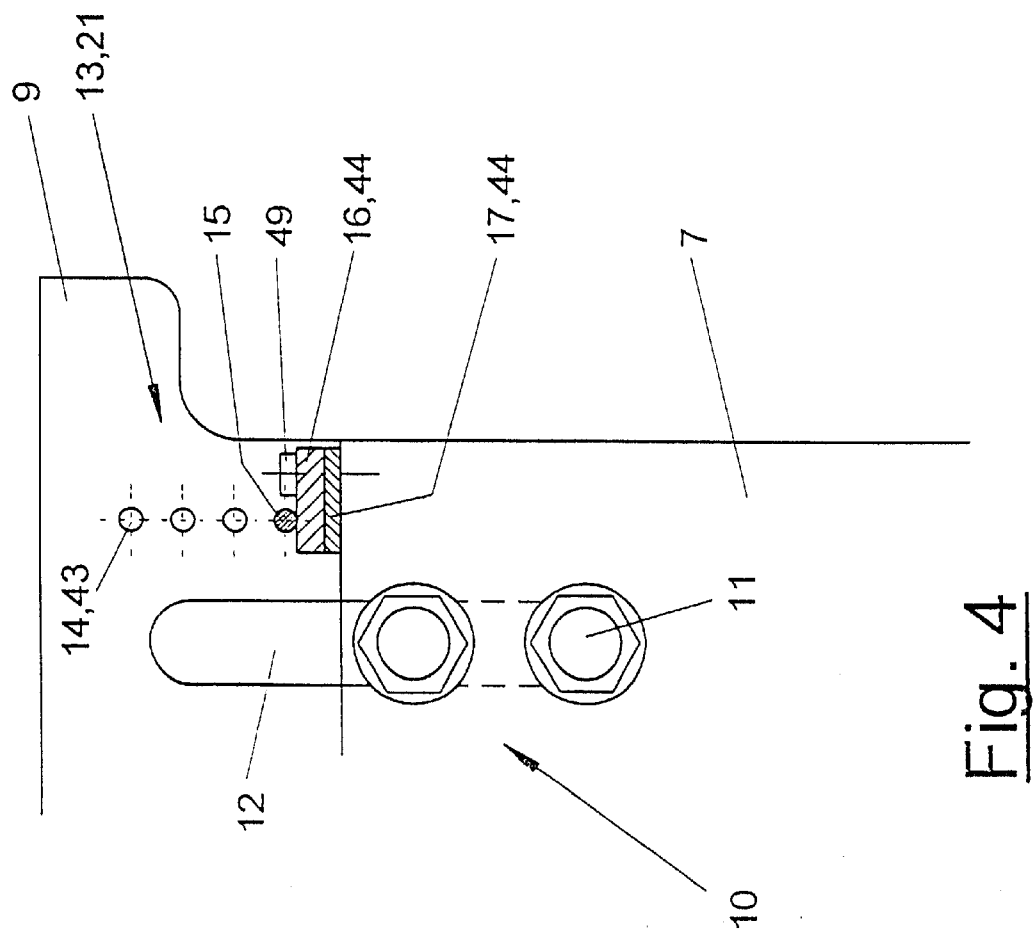
FIG. 4 is a vertical adjustment device of the tensioner according to FIGS. 2 and 3.

Referring to the drawings in particular, FIG. 1 shows a schematic top view of a clamping table 3, on which one or more workpieces 2 are clamped with one or more tensioners 4 in the exact position needed for machining. The workpiece 2 is preferably a body part of a vehicle. In the embodiment shown, it is a vehicle door. The tensioners 4 are mounted on the clamping table 3 at suitable points in a fixed or adjustable manner. The workpiece 2 is machined by an industrial robot (not shown) or by another suitable device in the clamped position. This may be, e.g., a welding operation.

The tensioners 4 have clamping elements that may have any desired design. In the embodiment shown, two clamping jaws 6 are provided, which are mounted movably, especially pivotably in relation to one another and receive between them and clamp two body panels 2 with fittingly machined clamping surfaces. They are actuated by a suitable drive 5. The drive 5 may have any desired design. It is preferably designed as a remotely controllable motor drive or as a hydraulic or pneumatic and likewise remotely controllable cylinder. The clamping elements are arranged at the adjusting part 9.

The individual tensioners 4 are multipart tensioners in the manner described below and are adjustable along at least one translatory and/or rotary axis. They are preferably adjustable vertically and/or in at least one lateral direction and/or in at least one angle. The possibilities of adjustment may be combined as described and may also be used individually.

The position of the tensioner may be changed continuously while maintaining the position on the clamping table 3. Machining-related errors on the workpiece 2 can be anticipatorily compensated with this adjustment. The tensioners 4 are deliberately set with a deviation from their specified desired position. For example, the tensioners 4 may be set slightly higher and/or with an angular deviation in order to compensate a warping caused by welding or the like as a result and to absorb and compensate a lowering of the workpiece 2 in the clamped area that occurs in this process. The workpiece 2 will then have the desired shape after the machining.

FIGS. 2 and 3 show a side view and a front view of an individual tensioner. The tensioner 4 is a multipart tensioner in itself and comprises, e.g., a foot part 7 and at least one adjusting part 9 adjustably arranged thereon. The foot part 7 has, e.g., a base 8, which is fastened, e.g., screwed, on the clamping table 3 in the specified position. In the embodiment shown, the adjusting part 9 comprises a vertically directed plate, which is adjustably guided in a suitable manner at the foot part 7. The guide 12, 12' may be, e.g., a groove guide engaging itself in a positive-locking manner or the like. In deviation from the embodiment shown, the tensioner 4 may also comprise more than two parts 7, 9.

To adjust the adjusting part 9 in relation to the foot part 7, a fixing device or fixing means 10 and a positioning device or positioning means 13 are provided, which may have various suitable designs. The positioning device 13 permits continuous adjustment of the parts 7, 9 over a broad range of adjustment and has a coarse adjustment means 43 and a fine adjustment means 44 for this.

In the exemplary embodiment shown, the fixing device 10 comprises a vertical elongated hole guide 12 in one of the two clamping parts 7, 9 and two or more clamping screws 11. In one embodiment, not shown, sleeve-like sliding blocks, which engage fitting countergrooves on the contact surfaces of the tensioner parts 7, 9 facing one another, may be arranged, e.g., clamping screws 11.

The positioning means 13 is designed as a vertical adjustment device or vertical adjustment means 21 in the exemplary embodiment according to FIGS. 2 through 4. The coarse adjustment device or coarse adjustment means 43 is provided here in the adjusting part 9 as a grid-like mount 14, which makes possible vertical adjustment at greater increments. The mount 14 comprises, e.g., a vertical row of holes, wherein the openings in the hole grid are preferably located at equally spaced locations from one another. A hinge pin 15, which is supported on the foot part 7 via the fine adjustment means 44, may be introduced into the mount 14 in the needed position. The fine adjustment means 44 comprises a support 16 and optionally one or more additional fitting plates 17 here. The support 16 may have a predetermined standard thickness. The fitting plate 17 may be ground or otherwise machined to an individual size. As an alternative, it may also be formed from a set of a plurality of prepared fitting plates, so-called shims. Continuous vertical adjustment is possible within the increment of the hole grid 14 by means of the support 16 and the fitting plates 17.

In one variant, not shown, the coarse adjustment means 43 or the mount 14 is designed as a groove grid. The mounting is brought about here by means of a sliding block, which is inserted into the mount 14 at a particular, desired height.

FIGS. 5 through 7 show a clamping apparatus 1, in which the positioning means 13 is designed as an angular adjustment device or angular adjustment means 22.

In FIGS. 5 through 7, the angular adjustment means 22 comprises a rotating unit 23, which is adjustable around an axis of rotation 25 that is essentially horizontal and extends at right angles to the principal plane of the adjusting part 9. The embodiment according to FIGS. 8 through 10 shows a variant in which the angular adjustment means 22 is designed as a tilting unit 30, which has a tilt axis 26 that is essentially horizontal and extends along the principal plane of the adjusting part 9. The axes 25, 26 are directed at right angles to one another. The clamping apparatus 1 may have a rotating unit 23 and/or a tilting unit 30 and optionally additionally a vertical adjustment means 21 of the above-described type.

The rotating unit 23 according to FIGS. 5 through 7 permits a continuous or incremental rotation of the adjusting part 9 in relation to the foot part 7. To do so, a rotary guide 27 is arranged between the foot part 7 and the adjusting part 9. As is illustrated in two variants in FIG. 6, the rotary guide 27 may have an elongated hole guide 28 bent around the axis of rotation 25 and/or a plurality of individual holes 29 arranged in a circular arc around the axis of rotation 25. The axis of rotation 25 is formed by a preferably central hole in the foot part 7.

The rotary guide 27 cooperates with the fixing means 10 and utilizes the clamping screws 11 for the angular adjustment. The lower clamping screw 11 forms the axis of rotation 25 and is inserted into the corresponding hole of the foot part. The upper clamping screw 11 is inserted into the rotary guide 27, 28, 29 and is set to the desired angle. The elongated hole guide 12 is located in the adjusting part 9. This part can be additionally adjusted vertically at a given angular position by means of the elongated hole guide 12. For example, a vertical adjustment means 21 corresponding to the above-described exemplary embodiments may be used for this purpose.

The foot part 7 may have a rotary support 24 for the vertical adjustment means 21. In the embodiment shown with three angular positions predetermined by means of individual holes 29, the rotary support 24 comprises a bent base, which has a support surface parallel to the base 8 in the middle area for the upright position according to FIG. 5. On the two adjoining flank areas, the base is beveled corresponding to the selected angular position. The support 16 with its fitting plates 17, the cam 18 or the stop 19 can be supported on the rotary support 24. The angular and vertical adjustment is fixed by means of the clamping screws 11.

FIGS. 8 through 10 show three different designs of the tilting unit 30. In the variant shown in FIGS. 8 and 9, the tilting unit 30 comprises a tilting base 31 with the tilt axis 26 arranged at the end. In addition, a flange 32 is articulated to the tilt axis 26. The tilted position is obtained by rotating the tilting base 31 in relation to the flange 32. The desired angular adjustment and the fixation are performed by means of an adjusting element 33 between the tilting base 31 and the flange 32, which is designed, e.g., as an adjusting screw and has an oblique guide for the tilting base 31 and for the accurate setting of the desired tilt angle.

In the embodiment according to FIG. 8, the flange 32 is directed essentially vertically and is fastened to the foot part 7 by means of the fixing device 10. A vertical adjustment means 21 may be present. The tilt axis 26 is located at the top edge of the flange 32. The tilting base 31 is again fastened to the adjusting part 9 by means of a fixing device 10. Longitudinal or vertical adjustment means 21 may be present here as well. The adjusting part 9 is pivoted by the tilting unit 30 in relation to the foot part 7.

In the variant according to FIG. 9, the tilting unit 30 is located between the base 8 and the clamping table 3, wherein the tensioner 4 as a whole can be pivoted in relation to the clamping table 3 around the tilt axis 26, which is essentially parallel to the table. The flange 32 is fastened to the clamping table 3. The tilting base 31 is connected to the base 8. The adjusting element 33 is directed vertically here. It is directed essentially horizontally in FIG. 8.

In the third variant according to FIG. 10, the tilting unit 30 comprises a wedge piece 34, which is arranged between the foot part 7 and the adjusting part 9. The wedge piece 34 has sloped fastening surfaces corresponding to the desired tilted position for the tensioner parts 7, 9. In the embodiment shown, the adjusting part 9 is tilted in relation to the foot part 7. A vertical adjustment means 21 may be additionally present at one or both fastening points here as well. As an alternative, the wedge piece 34 may also be arranged between the base 8 and the clamping table 3.

The various designs of the rotary unit 23 and the tilting unit 30 may be combined or interchanged with one another.

Figure 11:
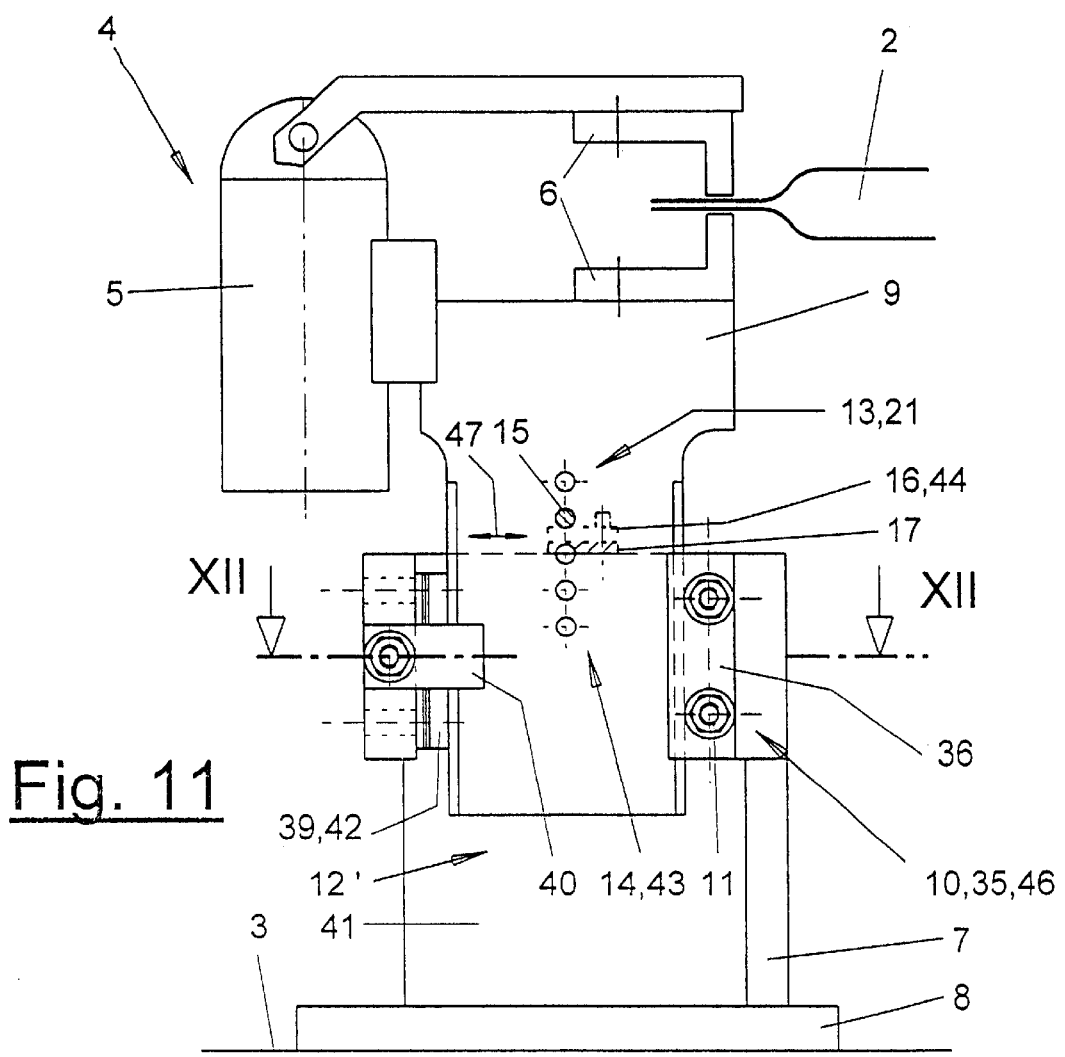
FIG. 11 is a side view of a variant of the tensioner with another fixing device and a lateral adjustment device.
Figure 12:
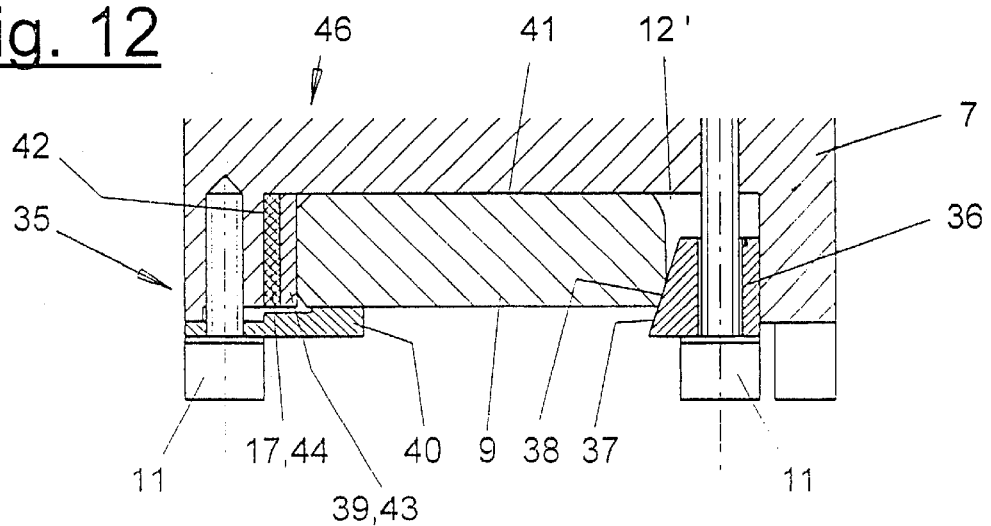
FIG. 12 is a sectional view through the arrangement shown in FIG. 11 corresponding to the section line XII—XII.
Figure 13:
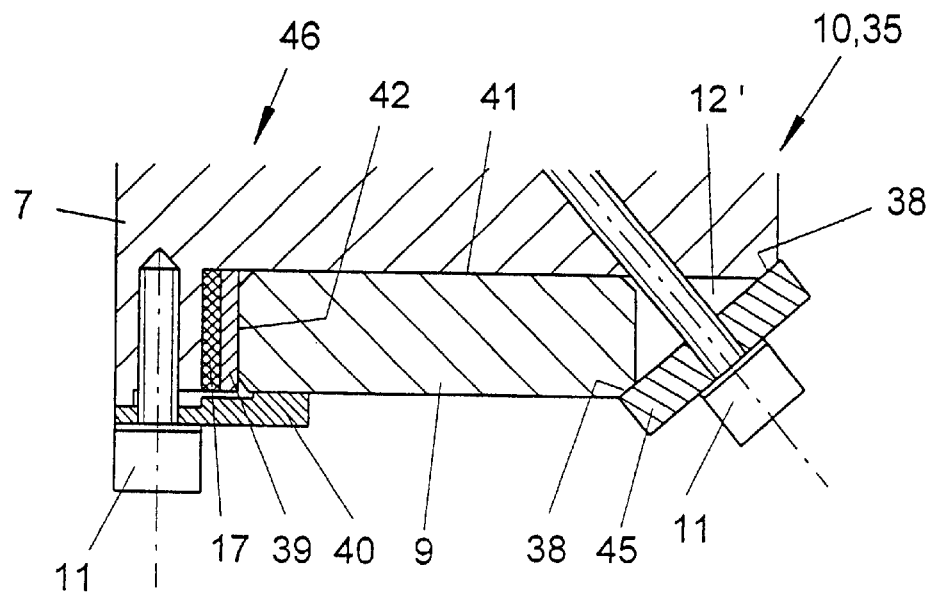
FIG. 13 is a view showing a variant of FIG. 12.

FIGS. 11, 12 and 13 show two variants of the fixing device 10. It is also used as a positioning device 21 for the lateral adjustment 46 at the same time and may be otherwise combined with any other desired positioning means 13. The fixing device 10 preferably acts is in two axes. It is designed as a clamping device 35, which acts on the guided and adjustable adjusting part 9.

Figure 14:
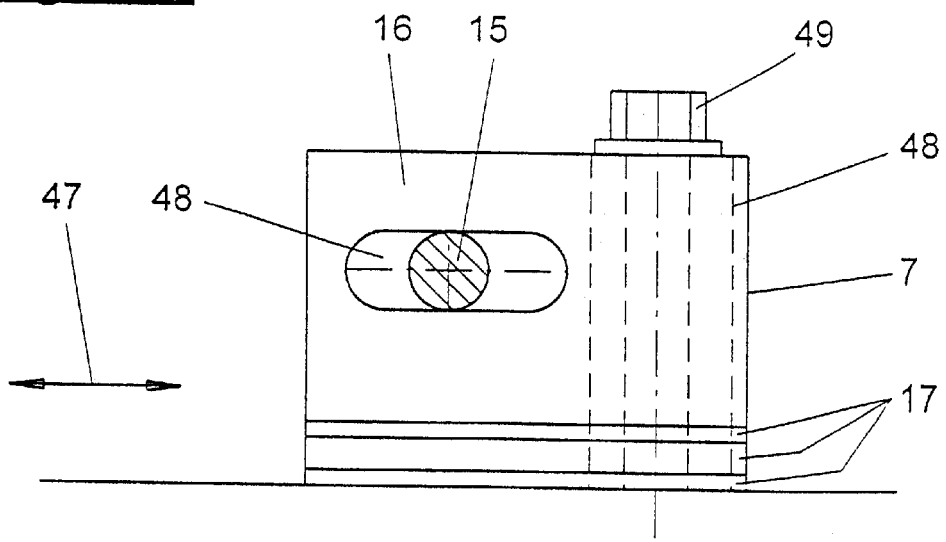
FIG. 14 is a variant of the support according to FIG. 4.

To make possible the lateral adjustment 46, an additional lateral mobility 47 is present in the area of the vertical adjustment means 21. FIG. 14 shows an example for this.

In the exemplary embodiment according to FIGS. 11 and 12, the clamping device 35 has at least one, preferably strip-shaped clamping wedge 36, which extends along the groove-like guide 12' and has one or more detachable fastening elements, preferably in the form of clamping screws 11, for fixation. The clamping wedge 36 has an oblique wedge surface 37, with which it can be pressed against a corner area 38 of the guided adjusting part 9. FIG. 12 shows the cross section of this arrangement. The clamping wedge 36 is preferably guided on its rear side located opposite the wedge surface 37 at a parallel side wall of the guide groove 12' and is supported laterally there.

The clamping wedge 36 is brought into contact by means of the clamping screws 11, which are preferably present as two more screws and are plugged into corresponding openings in the clamping part 36. The clamping screws 11 engage a thread in the foot part 7, which is arranged at the bottom of the guide groove 12'. This bottom also forms a guide surface 41 for the adjusting part 9. The clamping wedge 36 expands to the outside, so that it is pressed against the corner area 38 during the turning of the clamping screws 11.

The guided and adjustable adjusting part 9 is supported on two surfaces 41, 42 of the guide groove 12' which are located diagonally. These guide surfaces 41, 42 are preferably located obliquely opposite the wedge surface 37. An oblique force component at the corner 38 is transmitted by the oblique wedge surface 37 to the adjusting wedge 9, which ensures pressing on both guide surfaces 41, 42 located diagonally.

The shaft of the adjusting part 9 to be clamped preferably has an essentially rectangular cross section, wherein one or more corner areas 38 may be beveled or rounded. The two guide surfaces 41, 42 are correspondingly also arranged at right angles to one another. The guide surfaces 41, 42 may be formed directly by the guide groove 12' or the foot part 7.

For lateral adjustment 46 and for setting a defined lateral position of the adjusting part 9 in relation to the guide groove 12' and the foot part 8, one or more distance plates 39 and optionally also one or more fitting plates 17 may be placed under one or both guide surfaces 41, 42. The thicker distance plates 39 ensure the coarse adjustment 44 and the thinner fitting plates 17 the fine adjustment 43. FIG. 12 shows this arrangement based on the example of the lateral guide sure 42. The adjusting part 9 is in contact with the distance plate 39, and the adjusting part forms the guide surface 42 and in turn supported in an adjustable position on the adjacent side wall of the guide groove 12' via one or more fitting plates 17. Due to the bevel or rounding, the adjusting part 9 is not located in the corner area between the guide surfaces 41, 42, so that no position errors can occur here.

In addition, a clamping plate 40, which can be detachably fastened to the foot part 7 with a clamping screw 11 or the like, may be present on the side located opposite the clamping wedge 36. The angular clamping plate 40 presses the free surface of the adjusting part 9 from the outside and additionally presses it against the guide surface 41 and additionally secures the component 9 against separation in the adjacent corner area. However, the clamping plate 40 may alternatively also be omitted.

FIG. 13 shows a design variant to FIG. 12. The right-hand clamping screw 11 is directed obliquely in relation to the guide groove 12' here and has, instead of the clamping wedge 36, a pressure piece 45, e.g., in the form of a plate or a disk, which is pressed by the screw head against the correspondingly oblique corner areas 38 of the adjusting part 9 and of the foot part 7 and of the guide groove 12'. The guide groove 12 is open on the right-hand side in this variant.

The lateral mobility 47 in the area of the vertical adjustment means 21, which mobility is necessary for the lateral adjustment 46, may be designed in various ways. In the simplest embodiment shown in FIG. 11, the hinge pin 15 and the support 16 or the fitting plates 17 can slide in relation to one another in the direction of the lateral mobility 47. The hinge pin 15 lies only loosely on the top side of the support 16 here.

FIG. 14 shows a variant of this. The support 16 is designed as a large, parallelepipedic block, which has an opening 48 for passing through the hinge pin 15, which opening is designed as an elongated hole guide 48 provided along the lateral mobility 47 here. In addition, the support 16 is provided with a fixing means 49, e.g., a clamping screw, with which it can be fastened to the foot part 7 through the fitting plate 17. An elongated hole guide 48 in the direction of the lateral mobility 47 may also be present for the fixation 49. Similar fixing means may also be present in the case of the above-described supports in the other exemplary embodiments. One or more fitting plates 17 are located under the support block 16 in the above-described manner.

As a modification of the exemplary embodiments shown, the lateral mobility 47 may also have any other desired design. For example, the hinge pin 15 may be mounted movably in a suitable elongated hole guide at the mount 14, in which case the opening 48 in the support block 16 is designed as a cylindrical hole.

Various modifications of the exemplary embodiments shown are possible; e.g., a multi-step vertical adjustment may be provided. In addition, the tensioners 4 may optionally also be adjusted laterally in relation to the clamping table 3. This can be achieved, e.g., by means of a correspondingly modified fixing and positioning means 10, 13. Furthermore, the fixing device 10 and the positioning means 13 may also have any other desired suitable design. In addition, the design and the mutual arrangement and guiding of the tensioner parts 7, 9 may be varied. For example, the shape and the arrangement of the guide groove 12' as well as of the guide surfaces 41, 42 may vary. Another type of guide may also be present instead of the slideway shown. The shapes of the tensioner parts 7, 9 are also variable. The clamping wedge 36 may, e.g., co-rotate and then press the adjusting part 9 against the guide axis or the axis of rotation. Furthermore, a plurality of clamping wedges 36 may be present.

While specific embodiments of the invention have been shown and described in detail to illustrate the application of the principles of the invention, it will be understood that the invention may be embodied otherwise without departing from such principles.

What is claimed is:

1. A clamping apparatus for workpieces, the apparatus comprising:

a clamp positionable on a clamping table, said clamp having a plurality of clamp parts adjustably positionable in relation to one another along at least one axis;

a positioning device associated with said clamp;

a vertical adjustment device associated with said clamp;

a fixing device associated with said clamp, said positioning device, said vertical adjustment device and said fixing device for the mutual adjustment of said clamp parts, said vertical adjustment device having a coarse adjustment device and a fine adjustment device, wherein the said coarse adjustment device has a grid-shaped mount and a positioning pin on one clamp part and said fine adjustment means has a support and a fitting plate and a fine adjustment fixing device supporting said positioning pin on another clamp part.

2. A clamping apparatus in accordance with claim 1, wherein said positioning device additionally has an angular adjustment device and/or a lateral adjustment device.

3. A clamping apparatus in accordance with claim 1, wherein said vertical adjustment device and/or said angular adjustment device has a lateral mobility for said lateral adjustment device.

4. A clamping apparatus in accordance with claim 3, wherein said support has an elongated hole for receiving said hinge pin for providing the lateral mobility.

5. A clamping apparatus in accordance with claim 1, wherein said clamp parts include a foot part that can be mounted on the clamping table and an adjusting part that can be vertically and/or angularly adjusted thereon and fixed, wherein said grid-like mount and said positioning pin are arranged on said adjusting part and said support with said fitting plate and said adjusting device fixing device are arranged on said foot part.

6. A clamping apparatus in accordance with claim 1, wherein said mount comprises one of a hole or groove grid.

7. A clamping apparatus in accordance with claim 1, wherein said fixing device has a clamping device with a lateral adjustment device for laterally adjusting said tensioner parts.

8. A clamping apparatus in accordance with claim 1, wherein said fixing device has a clamping wedge or a pressure piece, which can be pressed by a fastening element against a corner area of the adjusting part, wherein the clamp parts include a guided adjusting part supported on the opposite side on two diagonally arranged surfaces of said guide.

9. A clamping apparatus in accordance with claim 8, wherein one or more distance plates are arranged at at least one guide surface for said lateral adjustment of said adjusting part.

10. A clamping apparatus in accordance with claim 8, wherein at least one said fitting plate is associated with said distance plate.

11. A clamping apparatus in accordance with claim 1, wherein said clamping device has a clamping plate that can be brought into contact with a guided component member, which is one of said clamp parts.

12. A clamping apparatus in accordance with claim 1, wherein said angular adjustment device comprises a rotating and/or tilting unit with adjustability along one or two axes.

13. A clamping apparatus in accordance with claim 12, wherein said rotating unit has a rotary guide between said foot part and said adjusting part with an axis of rotation that extends essentially horizontally and at right angles to the principal plane of said adjusting part.

14. A clamping apparatus in accordance with claim 13, wherein said rotary drive has a bent elongated hole and/or a plurality of individual holes arranged in an arc as well as a support for supporting said vertical adjustment device.

15. A clamping apparatus in accordance with claim 14, wherein said tilting unit has a said tilting base rotatable around a tilt axis directed along the principal plane of said adjusting part with an adjusting element, wherein said tilting base with its said tilt axis is mounted on a flange, which can be fastened to a foot part, which is one of said clamp parts, to said base or to the clamping table.

16. A clamping apparatus for automobile body part workpieces, the apparatus comprising:
a clamping table;
a clamp positionable on said clamping table, said clamp having a foot part that can be mounted on said clamping table and an adjusting part that can be vertically and/or angularly adjusted on said foot part and fixed;
a positioning means, associated with said clamp, for positioning said adjusting part relative to said foot part;
a vertical adjustment means, associated with said clamp, for vertically adjusting said adjusting part relative to said foot part, said vertical adjustment means having a coarse adjustment means and a fine adjustment means, wherein said coarse adjustment means has a grid-shaped mount and a positioning pin on one of said adjusting part and said foot part and said fine adjustment means has a support and a fitting plate and a fine adjustment fixing means supporting said positioning pin on the other of said adjusting part and said foot part; and
a fixing means, associated with said clamp, for fixing said adjusting part relative to said foot part.

17. A clamping apparatus in accordance with claim 16, wherein said positioning means additionally has an angular adjustment means and/or a lateral adjustment means.

18. A clamping apparatus comprising:
a clamping table;
a clamp positionable on said clamping table, said clamp having a foot mountable on said clamping table and an adjusting part adjustably positionable on said foot;
a first adjusting device having a grid and positioning pin on one of said foot and said adjusting means, said positioning pin being insertable into said grid to position said adjusting part at a plurality of coarse positions with respect to said foot;
a second adjusting device with a support on the other of said foot and said adjusting part, said second adjusting device including a plurality of fitting plates positionable between said support and said positioning pin to vary a position of said adjusting part between said coarse positions;
a fixing device selectively fixing said foot and said adjusting part together.

19. An apparatus in accordance with claim 18, wherein:
said coarse positions and said positions between said coarse positions vary in a same direction.

20. An apparatus in accordance with claim 19, wherein:
said coarse positions and said positions between said coarse positions vary in a lateral, angular and longitudinal direction of said foot.

* * * * *